Sept. 11, 1956 W. D. BROWN ET AL 2,762,996
PRINTING MEANS FOR AUTOMATICALLY RECORDING
VARIATIONS IN MECHANICAL BEHAVIOR
Filed Nov. 23, 1954 3 Sheets-Sheet 1

INVENTORS
WILLIAM D. BROWN
STANLEY O. GREGORY
BY M. Talbert Dick
ATTORNEYS

INVENTORS
WILLIAM D. BROWN
STANLEY O. GREGORY

Sept. 11, 1956 W. D. BROWN ET AL 2,762,996
PRINTING MEANS FOR AUTOMATICALLY RECORDING
VARIATIONS IN MECHANICAL BEHAVIOR
Filed Nov. 23, 1954 3 Sheets-Sheet 3

INVENTORS
WILLIAM D. BROWN
STANLEY O. GREGORY
BY M. Talbert Dick
ATTORNEYS

United States Patent Office 2,762,996
Patented Sept. 11, 1956

2,762,996

PRINTING MEANS FOR AUTOMATICALLY RECORDING VARIATIONS IN MECHANICAL BEHAVIOR

William D. Brown and Stanley O. Gregory, Des Moines, Iowa

Application November 23, 1954, Serial No. 470,704

3 Claims. (Cl. 340—205)

Our invention relates to that class of devices which measure and record the phenomena of mechanical movement and more specifically, we have invented a device which will record variations in mechanical behavior on a Teletype or electric printer.

There are many instruments which are adapted to record the variations in mechanical behavior, but those with which we are familiar either employ means for recording a graphical result of the mechanical conduct or other means for showing only relative or comparative variations.

Also the recording devices with which we are familiar are not adapted to give a consolidated record of multiple indicators which are often necessary to properly define or describe the mechanical conduct. These same devices also require very complex equipment to be sufficiently flexible to adjust to sudden increasing or decreasing of the magnitude or quantity in a given phenomena. Furthermore, many such recording devices are subject to being placed out of adjustment in the event of power failures or the like.

Therefore, it is one of the principal objects of our invention to provide a recording device that will transfrom the behavior of mechanical movement to actual figures printed in their proper units.

It is a further object of our invention to provide a recording device that can give a consolidated report from a multiplicity of indicators.

It is a further object of our invention to provide a recording device that is sensitive to sudden increases or decreases in the magnitude or quantity of a given phenomena by using a simple system of interlocking relays.

It is a further object of our invention to provide a recording device that is not placed out of adjustment by power failures or the like.

These and other objects will be aparent to those skilled in the art.

Our invention consists in the construction, arrangements, and combination, of the various parts of the device, whereby the objects contemplated are attained as hereinafter more fully set forth, specificaly pointed out in our claims, and illustrated in the accompanying drawings, in which:

While our method of and means for typing and recording heat data from various stations may be used for various purposes, it is particularly adapted for use in grain elevators. Stored grains present a considerable problem and if not closely watched and compared great losses result. The change of temperature in a grain volume may indicate danger of internal combustion, spoilage, or weevil activity. Obviously in a large storage elevator, the temperatures must not only be taken and compared periodically but must be taken at various localities or stations in the elevator. Usually the points for temperature data in a large bin will run from approximately ten to thirty or more. It is often found that only one area of the grain is of alarmingly high temperature. The immediate consideration of such an area will save all the remaining valuable grain. Also it is necessary to compare the heat data from several elevators to provide an answer to the grain condition. At present this is done by manual testing, recording and calculating, and much time is lost. In such installations as cement plants, the entire time of at least one expert is needed. While comparable chart graphs (manually prepared) do aid in station heat studies, they are slow, and subject to disastrous mistakes in both preparation and interpretation. In the case of grain bins or like our device, after installation, is capable of temperature readings from various locations electrically operating the various readings onto the printed page or card. To this end we use an electric typewriter or Teletype machine. The sequence of the data may be so impressed in arrangement on the paper sheet, that comparison and temperature data can be evaluated at a glance. With the above general value and description of our invention we will now describe the mechanism that makes the above objectives possible.

Figure 1:
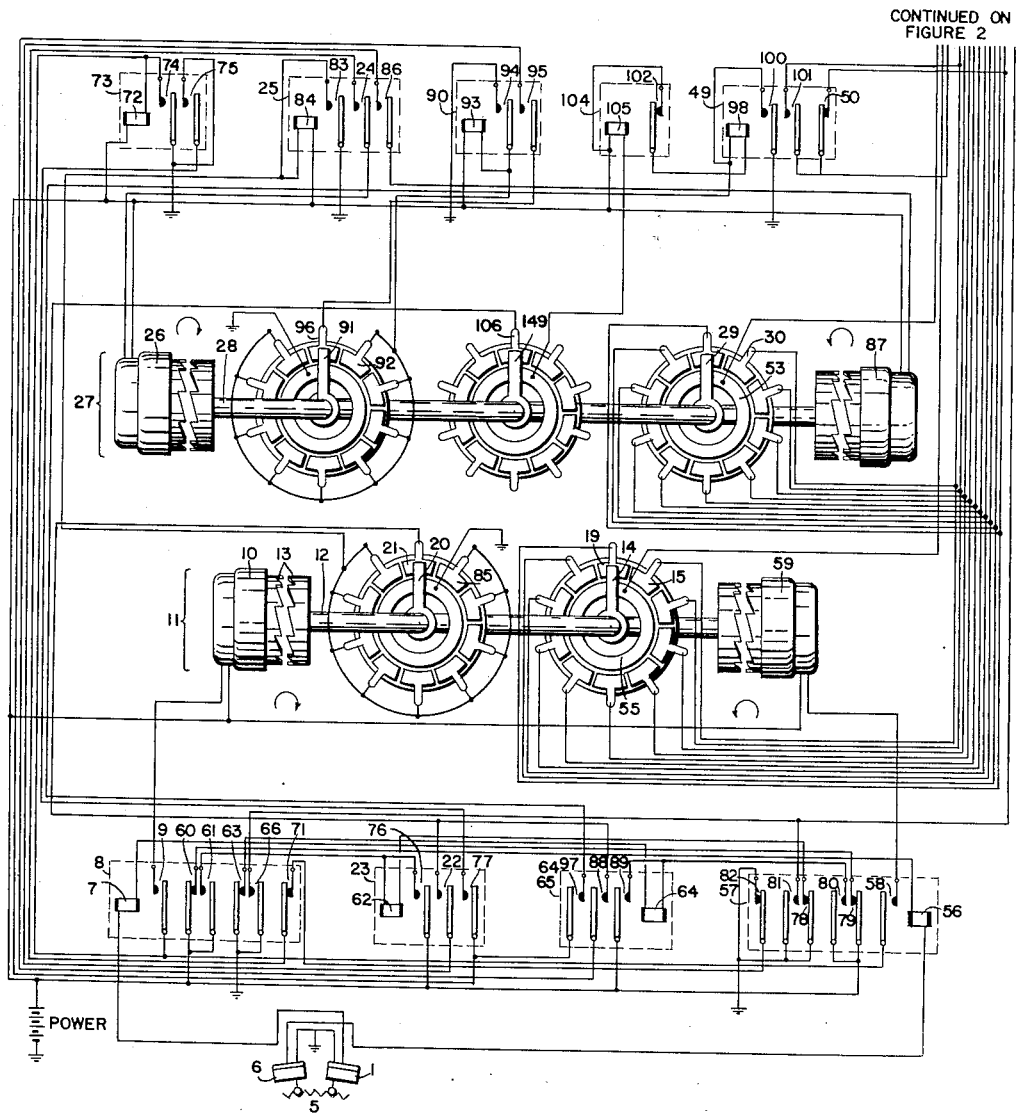
Fig. 1 is a drawing of the circuit used.
Figure 2:
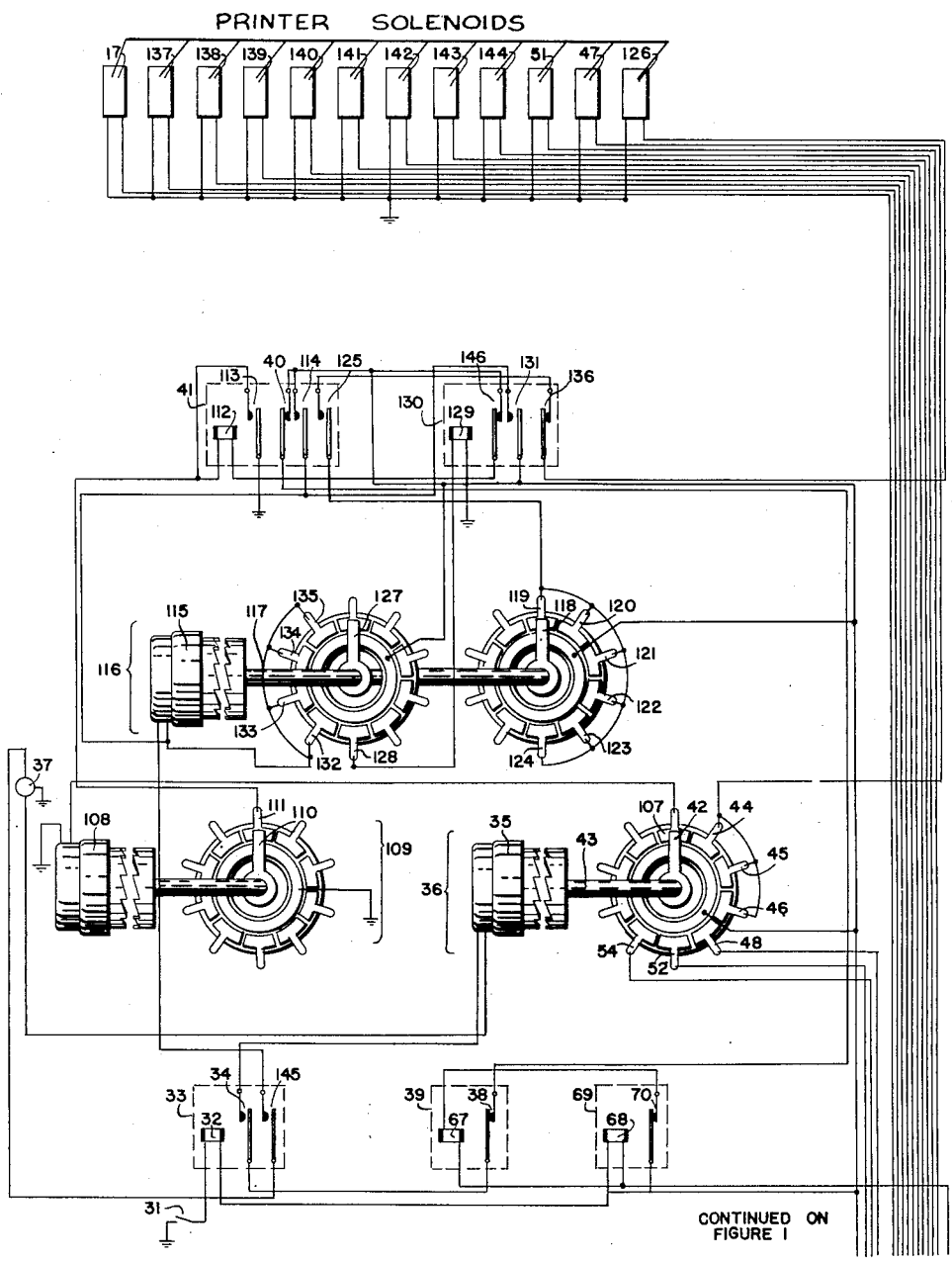
Fig. 2 is a continuation of the circuit.

Referring to Figs. 1 and 2, the system is illustrated as being comprised of 14 electrically operated relays and 5 impulse actuated rotary switches. Each has a specific duty to perform, and in order that their operation may be more readily understood, we will use the following names for the component parts.

The following is descriptive of the functions which the components serve in the circuit. Two six pole double throw relays are used, one as a forward pulsing relay 8 and one as a reverse pulsing relay 57. A single four pole double throw relay 41 is designated as a carriage return reset relay. Two three pole single throw relays are used, one as a forward drive relay 23 and one as a reverse drive relay 65. One more three pole single throw relay 25 is used as a power failure interlock tens count relay. Two additional three pole double throw relays are used, one as a hundreds count relay 49 and one as a carriage return relay 130. Three relays, each double pole single throw are used, one as a power failure interlock 73 one as a power failure interlock hundreds 90 and one as a printing relay 33. Two single pole single throw relays are used, one as a delay relay 39 and one as a slow closing relay 69. Two rotary, impulse operated, unidirectional switches are used, having one set of contacts. One a figure spacing switch 109 and one a sequence selector 36. Two rotary impulse switches, one of which is unidirectional for carriage return and line space 116 and one bidirectional for units count 11. A final rotary switch impulse operated by directional 27 with three sets of contacts for tens count is used.

Figure 3:
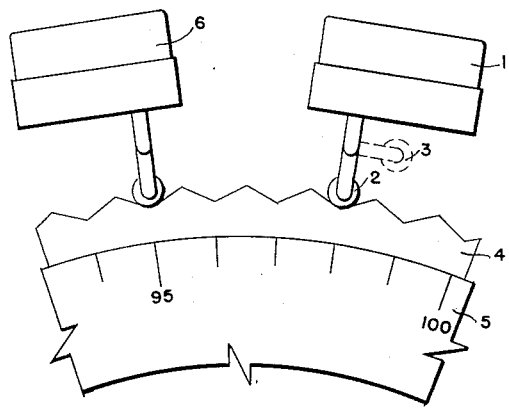
Fig. 3 is a section of an indicating instrument and the arrangement of micro-switches.

The initial impulse mechanism, referred to in Fig. 1, as 1, 5 and 6 is shown in greater detail in Fig. 3. Two microswitches 1 and 6 are used with roller operators 2 so designed as to act only when dial 5 is moving in a specific direction. Should the temperature change one degree the notched dial 4 affixed to the indicating dial 5 of a standard temperature indicator revolving in a counter-clockwise direction causes the roller 2 to ride up and down in the notch, making and breaking contact. Should the temperature fall, then roller 2 due to the clockwise rotation of dial 5, would fold up as shown in 3 rather than operate the microswitch. Thus, if the action of dial 5 is counter-clockwise (a rise in temperature) then only switch 1 will operate. Switch 6, roller 2 would fold so that microswitch 6 would not operate.

Figure 4:
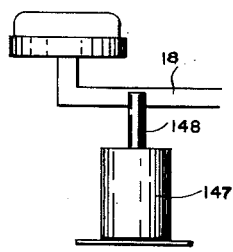
Fig. 4 is a drawing of a solenoid for operating keys of an electrical typewriter.

Fig. 4 illustrates the mechanical connection of an operating solenoid 147 through a connecting armature 148 to an operating key 18 of an electric printing mechanism as an electric typewriter. Twelve solenoids of similar construction as indicated in Fig. 2, are required. Seventeen connecting with the key of the printer to print the figure 1. Key actuating solenoid 137 connected with the key printing figure 2 likewise solenoids 137 through 144 are similarly connected to the consecutively numbered keys of the printer. Key actuating solenoid 51 so connected as to print 0. Key actuating solenoid 47 operating the printing machine spacer and key actuating solenoid 126 operating the carriage return key.

Figure 5:
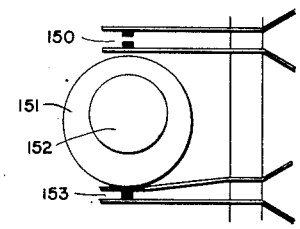

Figure 5 illustrates a mechanism for the converting of a constant direct current into a pulsing direct current. Shaft 152 on which an eccentric 151 is affixed, is attached to a motor revolving said shaft 152 at a predetermined speed. The eccentricity of 151 causes first contacts 153 to close while those of 150 are open then in its revolving 180° contacts 150 are closed and 153 are open.

Closing of microswitch 1 energizes the operating solenoid 7 of the forward pulsing switch 8 and closes contact $a$ to driver 10 of units counting switch 11 which acts to revolve shaft $n$ through engaging ratchets 13 and rotates shaft arm 14 one contact to the right to 15. This contact is directly connected to solenoid 17 which when properly energized, hereinafter described, depresses an operating key 18 shown on Fig. 4 of an electric typewriter, said key being one which prints the numeral 1.

Successive pulsing of microswitch 1 will revolve the arm 14 correspondingly, counting the pulses until the #10 contact 19 is reached. When this occurs, arm 20 connected to the common shaft 12 has completed one revolution synchronous with arm 14 and now makes contact 21 which then through interlock contact 22 of forward drive relay 23 (this contact is shown as open but is actually closed as will be later shown in that describing the system of interlocks) and interlock contact 24 of power failure interlock 25 energizes the driver 26 of tens count switch 27 causing the shaft 28 to rotate in a clockwise direction which positions arm 29 over one point to contact 30 which is connected to solenoid 17 as is units count switch 11 contact 15.

Printing of the numbers is accomplished in the following manner. When it is desired to print, switch 31 is closed, energizing solenoid 32 of the printing relay 33. Contact 34 to driver 35 of selector switch 36 is closed, driver 35 being pulsed by a pulsing mechanism 37 heretofore described and fully shown in Figure 5. Power to driver 35 is supplied through contact 38 of the delay relay 39 and contact 40 of carriage reset relay 41.

Pulsing of driver 36 moves arm 42 on shaft 43 successively over contacts 44, 45 and 46 which energizes key actuating solenoid 47 causing three spaces to be interjected between the printing of the data desired. The next contact 48 is connected to the hundreds count relay 49 contact 50 which is directly connected to the key actuating solenoid 51 which through the mechanical linkage, described in Fig. 4, will print the figure 0. The next pulse of the driver 35 of sequence selector switch 36 positions arm 42 with contact 52 which through contact ring 53 and arm 29 of tens counting switch 27 (which has been previously positioned on 30). Through contact 50 energizes key actuating solenoid 17 and as heretofore described, mechanically prints the figure 1. A further movement of arm 42 to contact 54 energizes the circuit through contact 55 and arm 14 of units counting switch 11, key actuating solenoid 17 so that it will print 1. Thus through the action of the arm 42, thus described, the figure 011 with three spaces preceding. Should dial 5 in Fig. 3 revolve counterclockwise, then the microswitch 6 is energized which in turn energizes solenoid 56 of the reverse pulsing relay 57 and through contact 58 energizes driver 59 of units counting switch 11 which rotates arm 12 in a counterclockwise direction.

A system of interlocks are employed, their purpose and function is as follows: When solenoid 7 of forward pulsing relay 8 was originally energized it in closing 9 also broke contact 60 so that no power could flow to solenoid 56 of reverse drive relay 57. It closed contact 61 which energized solenoid 62 of the forward drive relay so that power could flow through contact 22. Contact 62 is also broken so that solenoid 64 of reverse driver 65 cannot be energized. Contact 66 is closed which establishes the circuit to solenoid 67 of the delay relay 39 and solenoid 68 of the slow closing relay 69, solenoid 68 being energized through interlock contact 70 of slow closing relay 69. The use of these two relays is to prohibit printing should dial 5 of Fig. 3 be in motion.

Contact 71 of forward pulsing relay 8 is used to energize solenoid 72 of power failure relay 73 which, through contact 74 when closed by the solenoid 72, acts as a holding circuit to maintain contact 75 in a closed position providing power for driver 59 of unit counting switch 11. Power failure relays are required in this circuit to prevent the double action of the switch drivers should the main power source be broken, a phenomenon common to this type switch.

Holding contacts are used in the various relays to maintain their position, unless direction of rotation of the dial 5 of Figure 3 is changed, then they are released. That is in forward (clockwise motion), contact 61 energizes solenoid 62 which closes holding contact 76 maintaining contacts 22 and 77 in a closed position until through the action of the reverse direction relay 57, breaking contact 78, power to this solenoid 62 is broken. A similar circumstance occurs when dial 5 of Figure 3 is traveling in a reverse direction then contact 79 of the reverse direction relay 57 acts for this relay as does contact 60 for forward pulsing relay 8. Also contact 80 corresponds to the action of 61, 81 to 66, 82 to 71, and 89 to 76. Thus the two drivers, forward and reverse, are so interlocked as to prohibit any possible conflict in their individual operations.

The interlocking and protection of circuits is continued in the power failure tens relay 25 where the solenoid 84 has been energized by the arm 20 of unit counting switch 11, making contact with contact 85. This energizing of solenoid 84 closes contact 83 which holds contacts 24 and 86 until power failure occurs. The closing of 86 permits the energizing of driver 87 of tens count switch 27 on demand of reverse driver 65 contact 88. Power failure one hundreds relay 90 is originally energized by the rotation of arm 91 on shaft 28 of tens counting switch 27 to contact 92. This energizes solenoid 93 of power failure one hundreds relay 90 and closes contact 94 a holding circuit contact, and contact 95. When arm 91 of tens count switch 27 again reaches contact 96 a circuit is established through contact 95 to contact 77 of forward drive relay 23 and reverse drive relay 65 contact 97. The contact 77 of the forward drive relay 23 energizes the solenoid 98 of a hundreds counts relay 49 through contact 102 of a hundreds count release relay 104 so that it closes 100 a holding contact and 101 a contact to key actuating solenoid 17 so that the printing machine will print 1 instead of zero, as heretofore described.

Reversal of counting through the action of the reverse pulsing relay 57 energizes the then closed contact 97 of the reverse drive relay which in turn energizes solenoid 105 of a hundreds count release relay 104, through the action of arm 149 of tens counting switch 27, making contact with contact 106.

When the selector switch 36 has completed one revolution, arm 42 then rests again on contact 107 which energizes driver 108 of figure space switch 109. After ten revolutions of arm 42, corresponding to the printing of ten sets of readings, arm 110 again rests on contact 111, establishing contact to solenoid 112 of carriage reset relay 40 and powered through contact 146 of relay 130. This also closes contact 113, a holding contact, contact 114 which energizes driver 115 of carriage return and line space switch 116 through contact 145 of printing relay 32 and pulsed by mechanism 37 more fully described as Figure 5. Shaft 117 rotates revolving arm 118 through contacts 119, 120, 121, 122, 123, 124, which through contact 125 of carriage return and line space relay 41 energizes solenoid 126 which operates the carriage return key of the electric printer. Each pulse to the solenoid 126 caused by arm 118 moving from contact to contact 119 through 124 causes the printer to line space in the case illustrated five lines.

When the spacing has been completed, arm 127 makes contact with contact 128 energizing solenoid 129 of carriage return relay 130, breaking connection 131 supplying power to solenoid 112, causing it to drop out and stop. Contact 131 was closed by solenoid 129 and allows the driver 115 to move arm 127 to contacts 132 through 135 resetting arms 118 and 127 to their original position. Opening of contact 136 breaks the circuit to solenoid 126 which prohibits further upspacing until a new cycle is started.

Some changes may be made in the construction and arrangement of our printing means for automatically recording variations in mechanical behavior without departing from the real spirit and purpose of our invention, and it is our intention to cover by our claims, any modified forms of structure or use of mechanical equivalents which may be reasonably included within their scope.

We claim:

1. In a device of the class described, a source of power, a means of converting directed mechanical movement into electrical impulses, a first relay connected to said source of power and in series with a first stepping switch, a second relay, connected to same aforesaid source of power in series with a second stepping switch, said first stepping switch adapted to respond to each of said impulses, a means on said first stepping switch for making second stepping switch singly responsive to each ten of said impulses, a third relay interlockingly connected to said source of power and each of said first and second stepping switches so electrically arranged as to prevent operation of said stepping switches by an impulse given them when said source of power is turned on and off, and an electrical means connected to each of said stepping switches for printing the phenomena created by said mechanical movement.

2. In a device of the class described, a source of power, a means of converting directed mechanical movement into electrical pulses, a first relay connected to said source of power and in series with a first stepping switch, a second relay also connected to said source of power and in series with a second stepping switch, said first relay and first stepping switch adapted to respond to each of said impulses, a means on said first stepping switch for making said second stepping switch singly responsive to each ten of said impulses, an electrical means interlockingly connected to said first and said second relays to prevent operation when said source of power is turned on and off, an electrical means connected to said stepping switches and said source of power for printing the phenomena created by said mechanical movement.

3. In a device of the class described, a source of power, a means of converting bi-directional mechanical movement into related electrical impulses, a first circuit for said related impulses in a forward direction as opposed to those in a reverse direction, said first circuit connected to said source of power and comprising a first relay connected in series with a first stepping switch so adapted as to cause stepping in a forward direction, a second relay connected in series with a second stepping switch so adapted as to cause stepping in a forward direction, said first stepping switch so adapted as to respond to each of said impulses arising from forward mechanical motion, making said second stepping switch singly responsive in a forward direction to each ten of said impulses, a second circuit for said related impulses in a reverse direction as opposed to those in a forward direction, said second circuit connected to said source of power and comprising a third relay connected in series with the first stepping switch so adapted as to cause stepping in a reverse direction, a fourth relay connected in series with said second stepping switch so adapted as to cause stepping in a reverse direction, said first stepping switch so adapted also to make said second stepping switch singly responsive in a reverse direction to each ten of said impulses, an electrical means interlockingly connected to said first, second, third and fourth relays to prevent operation of said stepping switches by impulses given them by said power being turned on and off, said first and said third relays having normally closed contacts in each other's circuits and normally open contacts in their own circuit so that the energizing of either of said first or said third relay will close its own respective circuit and open the other circuit prohibiting conflicting operation, and an electrical means for printing said phenomena originated by said bi-directional mechanical movement.

References Cited in the file of this patent
UNITED STATES PATENTS

| | | |
|---|---|---|
| 344,121 | Mayers | June 22, 1886 |
| 499,610 | Todd | June 13, 1893 |
| 1,079,229 | Fitzerald | Nov. 18, 1913 |
| 2,207,743 | Larson | July 16, 1940 |
| 2,357,297 | Wack | Sept. 5, 1944 |
| 2,502,837 | Entz | Apr. 4, 1950 |
| 2,690,474 | Edgar | Sept. 28, 1954 |